Figure 1:
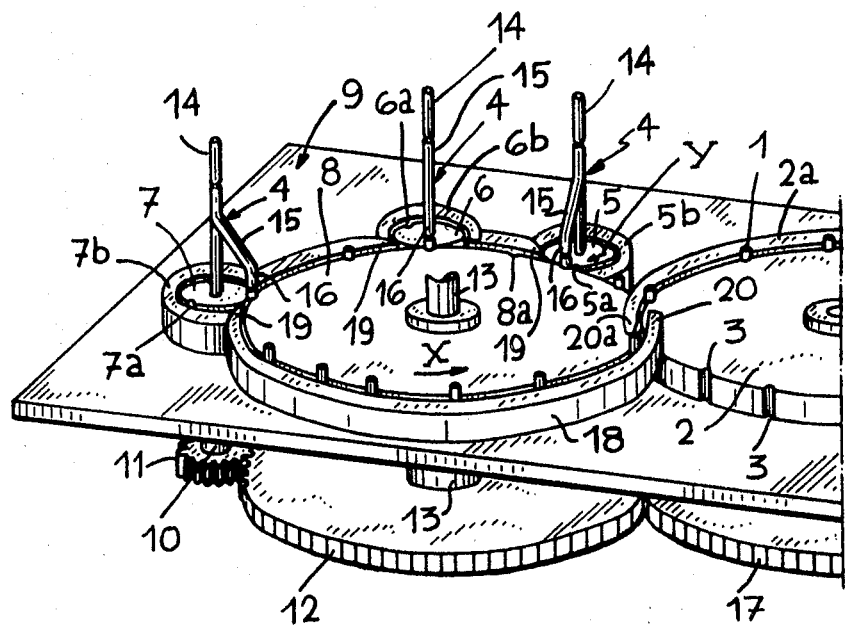

United States Patent

[11] 3,587,820

| [72] | Inventor | Maurice Lachaussee<br>360, rue de l'Yser, Ans-Lez-Liege, Belgium |
|---|---|---|
| [21] | Appl. No. | 756,938 |
| [22] | Filed | Sept. 3, 1968 |
| [45] | Patented | June 28, 1971 |
| [32] | Priority | Nov. 8, 1967 |
| [33] | | Belgium |
| [31] | | 41,521<br>Pat. 706,258 |

[54] ROTARY ARTICLE TRANSFER APPARATUS
3 Claims, 2 Drawing Figs.

| [52] | U.S. Cl. | 198/22, 198/25 |
|---|---|---|
| [51] | Int. Cl. | B65g 47/74 |
| [50] | Field of Search | 198/22, 25, 26, 76 |

[56] References Cited
UNITED STATES PATENTS

| 1,331,536 | 2/1920 | Soubier | 198/22X |
|---|---|---|---|
| 2,378,579 | 6/1945 | Popov | 198/26 |
| 2,949,996 | 8/1960 | Tonelli | 198/25 |
| 2,171,193 | 8/1939 | Ruau | 198/25 |

*Primary Examiner*—Edward A. Sroka
*Attorney*—Young and Thompson

ABSTRACT: Apparatus for feeding articles to pockets in the periphery of a rotary conveyor comprises a vertical chute mounted above a rotary transfer member that travels at the same peripheral speed as the periphery of the rotor, an upper portion of the chute being coaxial with the transfer member and a lower portion of the chute being inclined downwardly outwardly to the periphery of the transfer member and rotating with the transfer member so that articles passing down the chute are progressively accelerated to the peripheral speed of the rotor and transfer member.

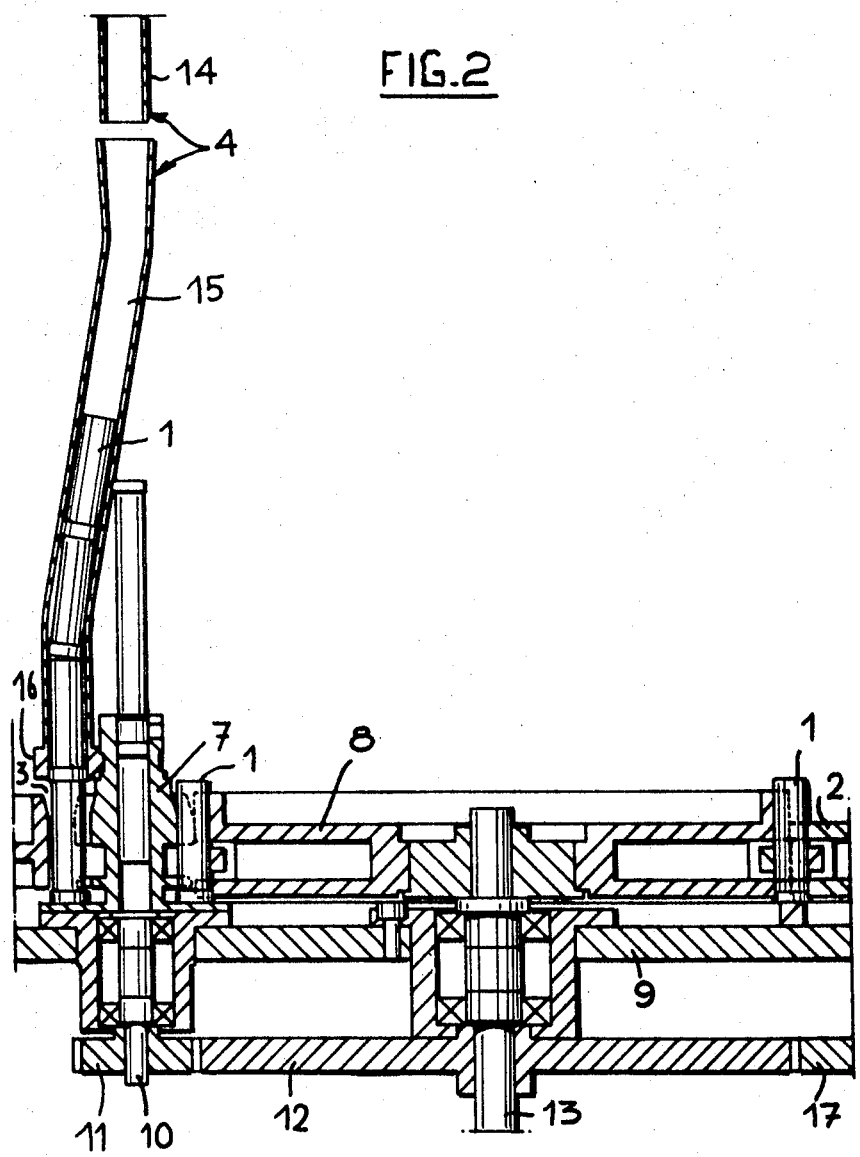

ROTARY ARTICLE TRANSFER APPARATUS

The invention relates to a means for transporting objects between two stations at least one of which rotates.

In known continuously moving machines, objects are supplied, for example, to a rotating platform or disc having receptacles on its periphery, of dimensions corresponding to those of the object for temporarily containing the latter. These objects are place one by one in the receptacle in the platform by means of a feed device comprising a trigger which ejects the objects from a magazine and which are then caught as the receptacles of the platform pass before the magazine empty.

In such apparatus, the objects pass abruptly from the stationary state in the feed device to the constant circumferential speed of the platform. Such a feed of the drum is possible when the latter turns at a relatively slow speed. When the drum turns at a greater speed, in order to increase output, the impacts resulting from the abrupt passage of the objects from the magazine into the pockets of the drum are more violent and may cause injury to these objects. This drawback is particularly apparent where cartridge cases are being fed.

An object of the present invention is to provide means of transport and a feed device of a continuously moving machine, in which the rotating platform or disc may turn at a high speed without incurring the above-mentioned drawback.

The invention consists in apparatus for transferring objects to or from a first orbiting station to or from the adjacent end of a conveyor which is at the same rotational speed as the station, the object being transferred to or from another station adjacent to the other end of the conveyor which station is stationary or moving at a different orbital speed but the same rotational speed as the first station and the conveyor.

In order that the lower part of the conveyor tube turns at the same rotational speed as that of the receiving platform, the lower part of the conveyor tube leading to the receptacle is rotatable with the shaft of rotation of the receiving platform. According to an embodiment, one end of the conveyor tube facing a receptacle of the receiving platform is mounted for rotation with the latter.

Where the above-mentioned objects risk becoming imbricated in each other in the passage, on the one hand of an object from the receiving platform of transference and, on the other hand, of an object from the conveyor tube into a receptacle of the receiving platform, then, at the lower part of the conveyor tube, provision is made for the one-by-one distribution of the said objects, this means of distribution operating at the moment of transfer of an object from the receiving platform to the grouping and transfer platform.

The invention will now be described with reference to the accompanying drawings which illustrate embodiments of the invention, wherein:

FIG. 1 is a partial diagrammatic view, in perspective, of apparatus according to the invention; and FIG. 2 is a section in elevation of the device of FIG. 1.

In these different FIGS., which comprise only those elements that are necessary to an understanding of the invention the reference FIGS. designate identical elements.

In the drawings, the feed device according to the invention is designed to feed a continuously moving machine with cylindrical objects 1, for example the cases of sporting cartridges. In this embodiment, the continuously moving machine comprises a rotating platform or disc moving at a continuous speed, designed to receive the above-mentioned objects 1 in receptacles 3 provided in its periphery and distributed at regular intervals along the latter. The rotating platform 2 is an element of a continuously moving machine intended, for example, for the filling of the cases of sporting cartridges.

The feed device, according to this embodiment includes three conveyor tubes 4 which respectively supply cartridge cases 1 to receptacles 5a, 6a and 7a disposed on the periphery of three receiving platforms 5, 6 and 7. The cases are transferred to the rotating platform or disc 2 of the machine by a grouping and transfer disc 8 which also has at its periphery receptacles 8a for the cases 1.

The receiving platforms 5, 6 and 7 and the disc 8 and 2 are disposed above a horizontal table 9. Receiving platforms 5, 6 and 7 are disposed substantially tangentially around the grouping and transfer disc 8 which is disposed tangentially to the above-mentioned drum 2. The receiving platforms 5, 6, 7 are mounted on shafts 10 which are rotated by drive pinions 11, meshing with a transmission pinion 12 mounted on a shaft 13 on which the grouping and transfer disc 8 is also mounted.

The conveyor tubes 4 are each fed with cases 1 by feed storage means (not shown). Each of the above-mentioned tubes 4 includes an upper vertical part 14 fixed in space and a lower part 15 having two bends. The upper part 14 are and lower part 15 of each of the tubes 4 are connected together, for example by a ball bearing (not shown) so that the lower, cranked part 15 may rotate about the axis of the upper, fixed part 14.

The receiving platforms 5, 6 and 7 have on their peripheries at least one receptacle 5a, 6a, 7a, for receiving the cases 1 delivered by the corresponding conveyor tubes 4. The lower parts 15 of tubes 4 are mounted for rotation with the corresponding drive shafts 10 on which are mounted the receiving platforms 5, 6 and 7.

Moreover, the disc 2 of the continuously moving machine is mounted on a shaft (not shown) which is driven by a pinion 17 meshing with the above-mentioned transmission pinion 12. Accordingly, the receiving platforms 5, 6 and 7, the grouping and transfer disc 8 and the disc 2 rotate at rotational speeds that are in fixed proportion to each other.

The cases 1 are gravity fed through tubes 4 from the feed storage means and delivered to one of the receiving platforms. The cases 1 conveyed in this way have initially a zero orbital speed when passing through the upper part 14 of the respective tube 4 and accelerate to a given orbital speed in the lower part 15 of the tube which is the same as that of the receiving platforms 5, 6 and 7.

The receiving platforms 5, 6 and 7 and the disc 8 are respectively surrounded by the concentric guides 5b, 6b, 7b and 18. The cases 1 in the respective receptacles 5a, 6a, 7a and 8a are bound on one side by the guides 5b, 6b, 7b and 18. The guide 18, concentric with drum 8, is in three parts each having a tapered arm 19. These arms 19 are respectively disposed near to the points of transfer of the cases 1 from the receiving platforms 5, 6, 7 to disc 8, in such a way as to enable the cases 1 to leave the receptacles of the receiving platforms and enter the corresponding receptacles 8a of the disc 8.

Similarly, the cases 1 transferred to the drum 8 and contained by the guide 18 are later transferred to the drum 2 by a switching system 20, 20a. The arm 20 is the end of the guide 2a concentric with the disc 2.

To avoid the cases 1 becoming imbricated when passing from a receiving platform to the drum 8, the end 16 of the lower part of each tube 4 may be provided with a retaining element for holding the case 1 ready to descend into a receptacle 3 of the above-mentioned receiving platform during the lapse of time necessary for the passage from the platform to the disc 8.

It is to be noted that a greater or smaller number of receiving platforms can be disposed around the disc 8, the number of receptacles of each of these platforms depending on the number of receiving platforms. In the chosen example, the drum 8 rotates in the anticlockwise direction indicated by the arrow X, while the receiving platforms rotate in the clockwise direction Y indicated on platform 5, and the platforms 5, 6 and 7 thus respectively comprise one receptacle 5a, two receptacles 6a and three receptacles 7a.

I claim:

1. Rotary article transfer apparatus transfer apparatus comprising a first rotor having at least one peripheral recess thereon for receiving an article, means to supply articles of said recess, a second rotor having a plurality of peripheral recesses thereon, means for driving said rotors at the same peripheral speed with said at least one recess of said first rotor registering with at least one recess of said second rotor, and fixed guides concentric with and surrounding each of said rotors to retain articles in said recesses and to transfer articles from said at least one recess of said first rotor to said recesses of said second rotor, said article-supply means comprising an upright chute concentric with said first rotor and having a lower portion that inclines downwardly outwardly toward said at least one recess and that rotates with said first rotor.

2. Rotary article transfer apparatus comprising a plurality of first rotors each having at least one peripheral recess thereon for receiving an article, means to supply articles to said recesses, a second rotor having a plurality of peripheral recesses thereon, and means for driving said rotors at the same peripheral speed with said recesses of said first rotors registering with recesses of said second rotor, said article-supply means comprising an upright chute concentric with each said first rotor and having a lower portion that inclines downwardly outwardly toward said at least one recess of the associated said first rotor and that rotates with said associated first rotor.

3. Rotary article transfer apparatus comprising a first rotor having at least one peripheral recess thereon for receiving an article, means to supply articles to said recess, a second rotor having a plurality of peripheral recesses thereon, and means for driving said rotors at the same peripheral speed with said recess of said first rotor registering with recesses said second rotor, said article-supply means comprising an upright chute concentric with said first rotor and having a lower portion that inclines downwardly outwardly toward said recess of said first rotor and that rotates with said first rotor.